United States Patent [19]
Sung et al.

[11] Patent Number: 5,177,695
[45] Date of Patent: Jan. 5, 1993

[54] DEVICE AND METHOD FOR ADAPTIVE DIGITAL POWER CONTROL

[75] Inventors: Sheehyung Sung, Waukegan; Edem Nkanta, Schaumburg, both of Ill.

[73] Assignee: Motorola, Inc., Schaumburg, Ill.

[21] Appl. No.: 548,399

[22] Filed: Jul. 5, 1990

[51] Int. Cl.⁵ .................. G05B 13/02; G05B 21/02; G06F 15/20
[52] U.S. Cl. .................. 364/553; 364/148; 364/157; 364/179
[58] Field of Search .............. 364/148, 157, 179, 553

[56] References Cited

U.S. PATENT DOCUMENTS

| | | | |
|---|---|---|---|
| 3,591,779 | 7/1971 | Sutherland, Jr. | 364/179 |
| 4,349,868 | 9/1982 | Brown | 364/157 |
| 4,879,643 | 11/1989 | Chakravarty et al. | 364/148 |
| 4,910,692 | 3/1990 | Outram et al. | 364/420 X |

Primary Examiner—Edward R. Cosimano
Attorney, Agent, or Firm—Darleen J. Stockley

[57] ABSTRACT

An adaptive power control device and method are disclosed in which characteristics of a transfer function of a power control system are dynamically manipulated upon selective variation of a sampling rate of power control output values. Systematic monitoring of critical sampling rates allows for alternate assignment of part of a power control system workload during slower sampling frequencies. Upon determination of an operably insignificant variation of a power control system output value from a previous power control system output value, the sampling rate is decreased, enabling reallocation of a portion of the workkload of the digital power control device.

44 Claims, 3 Drawing Sheets

100

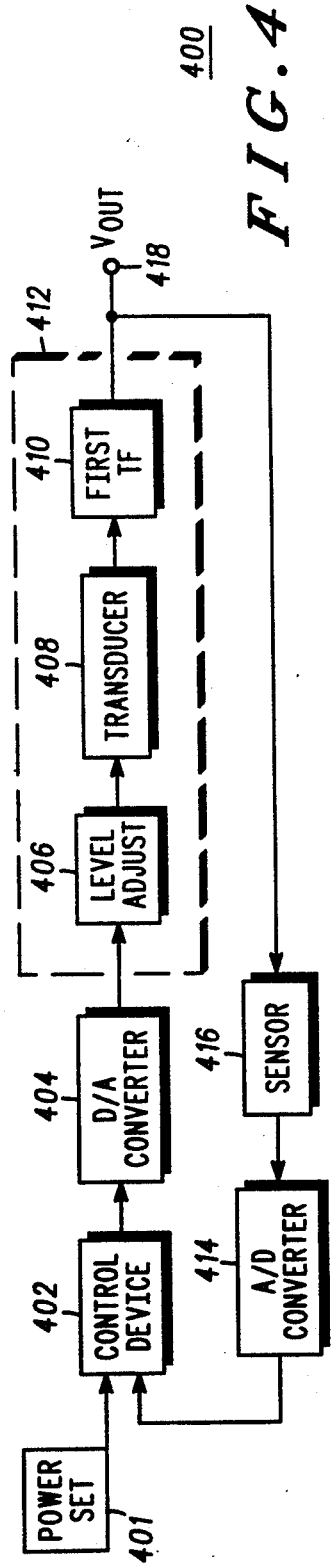
FIG. 4
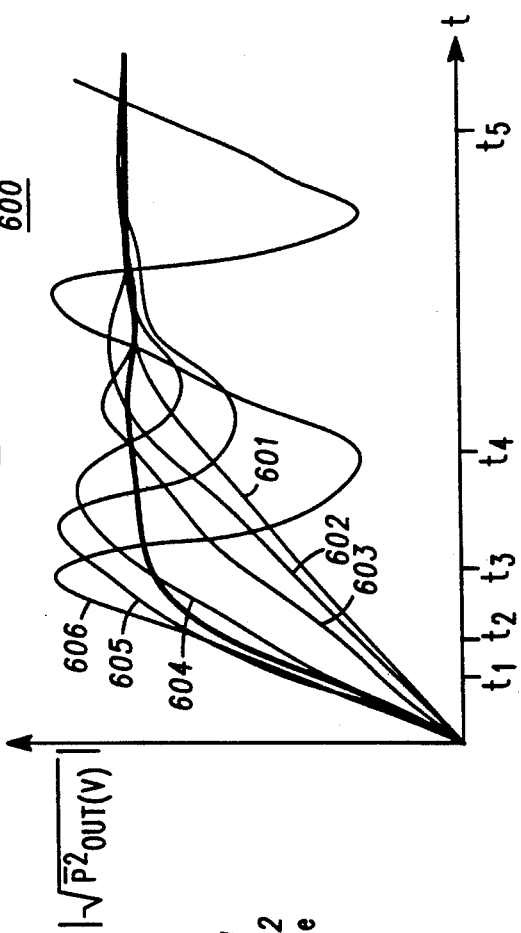
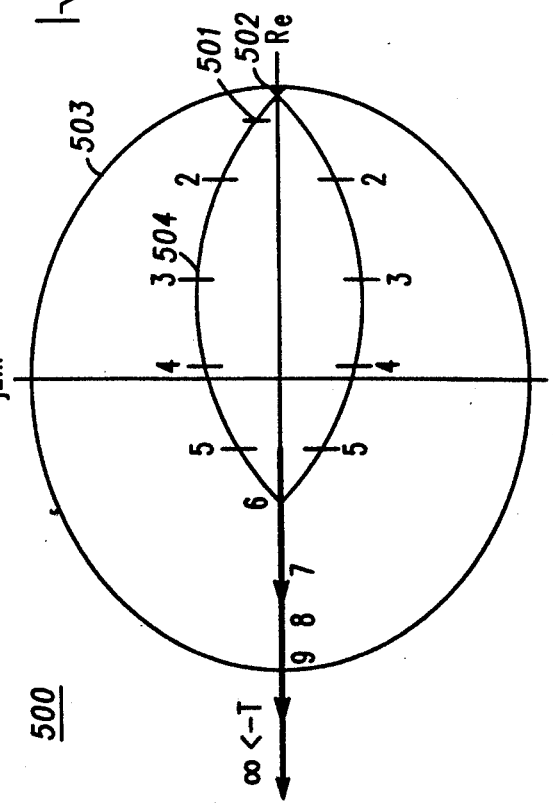

DEVICE AND METHOD FOR ADAPTIVE DIGITAL POWER CONTROL

BACKGROUND OF THE INVENTION

Digital power controls typically use a constant sampling method, selecting a sampling rate for particular power control characteristics. Changing a power control characteristic generally requires modification of a transfer function of a control device, which in turn typically requires modification of a physical component of a related control system.

Adaptive analog power control systems have been developed such as SPECTRA 800 and 900 MHz power control. The need exists for an adaptive digital power control system that allows alteration of a digital power control without requiring simultaneous physical modification of the system.

SUMMARY OF THE INVENTION

The need for a digital power control device for altering the degree of dedication of a system to power control without requiring simultaneous physical modification of that system and other needs are substantially met by the present invention.

An adaptive power control device and method are provided for controlling, at least in part, a controlled device having a transfer function, by selectively utilizing a modified digital power control sampling rate to adjust the transfer function.

A control device is utilized for controlling, at least in part, a controlled device having a transfer function, wherein the control device controls the controlled device, at least in part, by sampling an output parameter of the controlled device at a sample rate to obtain at least three sample values: a selected sample value, a sample value previous thereto, and a further selected sample value. The control device utilizes the sample values of the output parameter to control the sample rate as a function of the output parameter sample values, and to automatically alter the transfer function as a function, at least in part, of the sample rate.

One embodiment utilizes a comparison of consecutive differences of the sampled output parameter to determine a modification of the sampling rate that will adjust the controlled device transfer function so as to obtain a desired output parameter.

Another embodiment utilizes a standard deviation algorithm to determine when a delay of sampling may be utilized, thereby optimizing the control function process and, at the same time, increasing the efficiency of the controlled device by allowing the controlled device to perform additional functions during the delay time.

A method for controlling, at least in part, a controlled device having a transfer function, by sampling an output parameter of the controlled device at a selected sample rate to obtain at least three sample values, and utilization of the sample values as set forth above.

BRIEF DESCRIPTION OF THE DRAWINGS

FIG. 4 is a block diagram of a closed loop feedback control system implemented in accordance with the present invention.

FIG. 5 is a diagram illustrating root loci of a second order control system with varying sampling times as utilized with the present invention.

FIG. 6 is a graph illustrating a sampling time switching for a unit step power response of a second order system with respect to time in accordance with the present invention.

DETAILED DESCRIPTION

Figure 1:
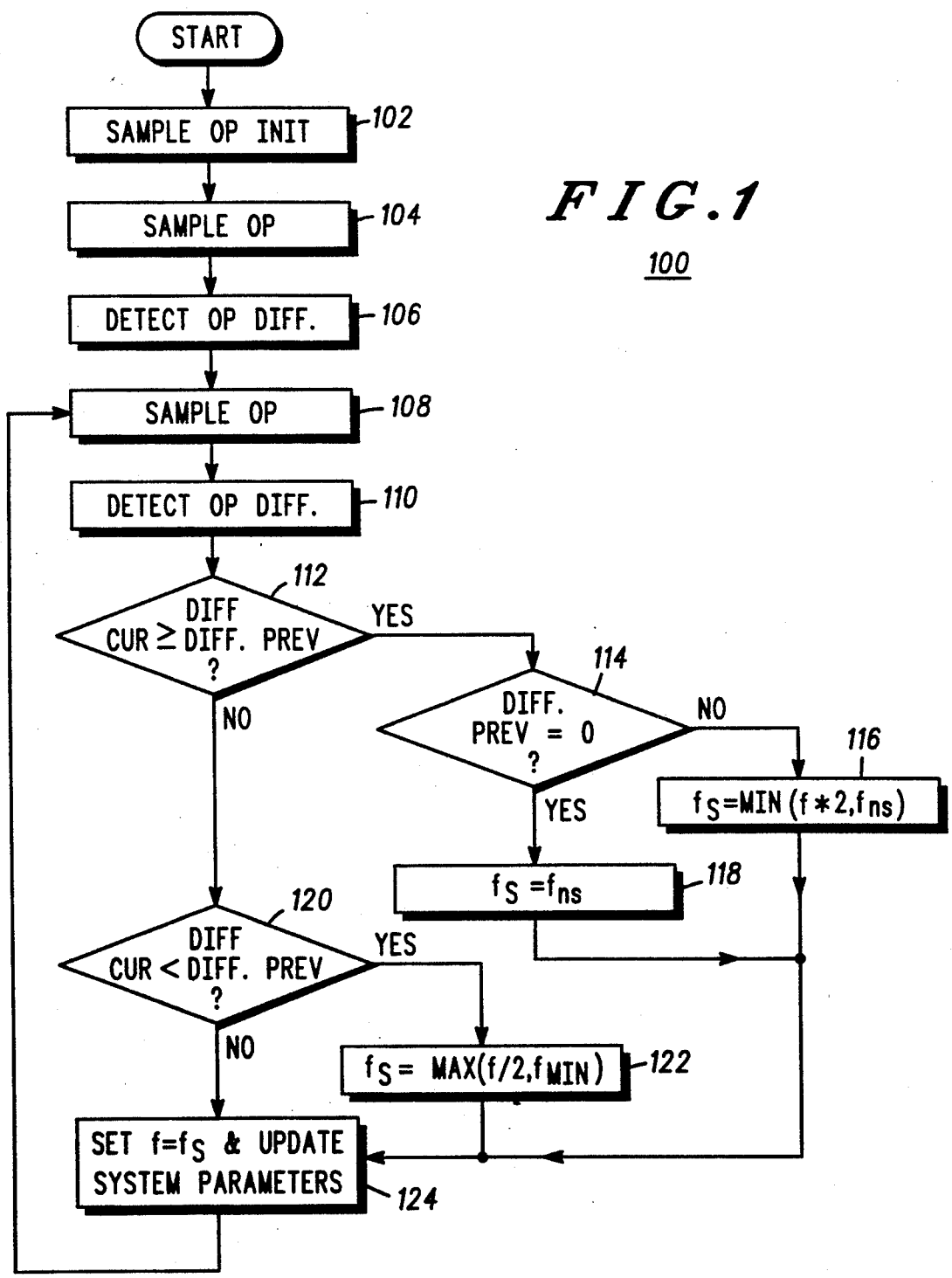
FIG. 1 is a flow diagram setting forth a digital power control method utilizing a power difference detection technique in accordance with the present invention.

FIG. 1, generally depicted by the numeral 100, sets forth a flow diagram of a digital power control method utilizing a power difference detection technique in accordance with the present invention.

In one embodiment, an initial output parameter (OP init) of a controlled device is sampled (102), followed by another sampling of the output parameter (OP) at a selected time (104). A typical initial output parameter value is zero. The output parameter is sampled (104) at least three times, obtaining at least three samples: a selected sample, a sample previous thereto, and a further selected sample. The sample previous thereto is that sample obtained immediately previous thereto and the further selected sample is that sample obtained immediately subsequently thereto. A typical output parameter sampled is an output power of the controlled device. A first difference between the selected sample of the output parameter and the sample previous thereto is determined (106), and a second difference between the selected sample (108) and the further selected sample is also determined (110). The first difference is compared with with the second difference (112, 120).

When the second difference, a current difference (DIFF cur), is greater than the first difference, a previous difference (DIFF prev), and the first difference is substantially equal to zero (114), a predetermined maximum sample rate allocated for control usage, $f_{ns}$, is set (118). A typical predetermined maximum sample rate allocated for control usage is 2.5 KHz.

When the second difference, a current difference (DIFF cur), is greater than the first difference, a previous difference (DIFF prev), and the first difference is not substantially equal to zero (114), a maximum sample rate value is selected as the smallest of: a product of the utilized sample rate multiplied by two (f*2), and a predetermined maximum sample rate allocated for control usage ($f_{ns}$) (116).

When the second difference, a current difference (DIFF cur), is less than the first difference, a previous difference (DIFF prev) (120), a maximum sample rate is selected as the larger of: a quotient of the utilized sample rate divided by two (f/2), and a predetermined minimum sample rate allocated for control usage ($f_{min}$) (122). A typical predetermined minimum sample rate allocated for control usage is 50 Hz.

After utilizing the comparison of the first difference and the second difference to obtain a selected sample rate (116, 118, 122 120(no)), the sample rate is set to the selected sample rate, $f_s$, and system parameters are updated (124). Updating system parameters includes automatic selection of a sampling rate, $f_s$, that alters a characteristic output response in accordance with approximating a preselected desired output response for any order system in a manner demonstrated in FIG. 6, thereby automatically altering a damping coefficient related thereto. Then the process recycles to obtaining a further selected sample (108).

The control device adjustments on the controlled device provide a dynamic manipulation of control loop characteristics, eliminating the need for a dedicated control system microprocessor and allowing for flexibility in control system modification. Simultaneously, the efficiency of the control device is optimized.

Figure 2:
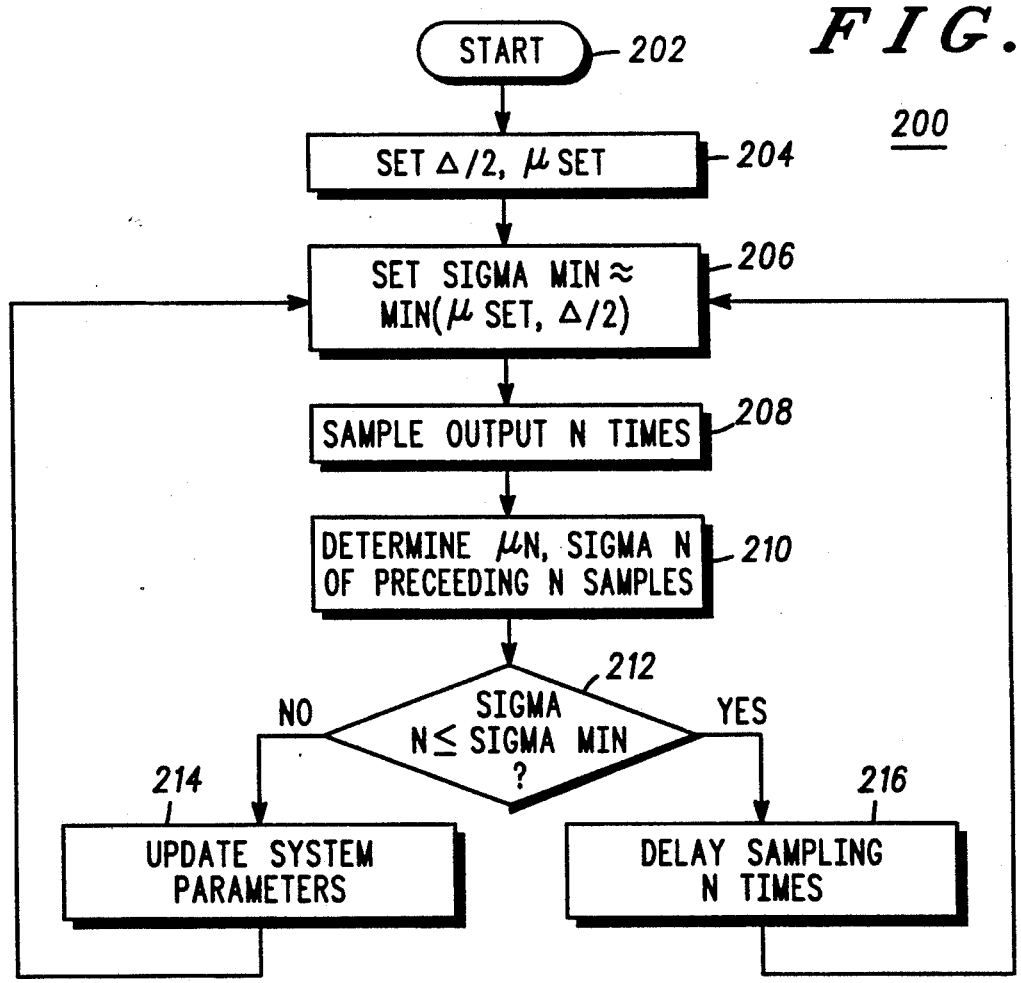
FIG. 2 is a flow diagram setting forth a digital power control method utilizing a standard deviation algorithm.

FIG. 2, generally depicted by the numeral 200, sets forth a digital power control method utilizing a standard deviation algorithm.

In one embodiment, a beginning power input is determined (start) (202). A typical beginning power input value is zero. A predetermined minimum acceptable standard deviation value, $\Delta/2$, a typical such value being plus or minus one decibel, is preset together with a desired predetermined maximum arithmetic mean value, $\mu_{set}$, for a difference between a selected sample and a sample previous thereto (204), a typical such deviation being $\pm 0.5$ dB. A predetermined minimum desired standard deviation value, sigma$_{min}$, being a smallest value of: $\mu_{set}$ and $\Delta/2$ is preset (206).

An output parameter of a controlled device is sampled N times (208), obtaining a plurality of samples, N, being at least a number of samples substantially equivalent to a quotient of a reciprocal of a bandwidth of a controlled system of the controlled device and a minimum conversion time predetermined and set by the control device. A typical output parameter sampled is output power of the controlled device, and the plurality of samples of sampled output parameter is obtained by successive sampling at a selected sample rate.

A standard deviation value of a preceding N samples, sigma N, and an arithmetic mean of the preceding N samples, $\mu$N, are determined (210). It is determined whether sigma N is less than or equal to sigma$_{min}$ (212). When sigma N is not less than or equal to sigma$_{min}$, updating system parameters by recycling (214) to setting sigma$_{min}$ (206) and then sampling the output parameter N times (208) takes place. When sigma N is less than or equal to sigma$_{min}$, delay of N sampling cycles, then recycling (216) to setting sigma $_{min}$ (206) and sampling the output parameter N times (208) takes place. In both cases recycling, $\mu_{set}$ is reset to an immediately preceding $\mu$N for an immediately preceding N samples.

The first comparison value may be selected to be a slope determined by determining a quotient of a difference between a selected sample and a sample obtained immediately previous thereto divided by a time lapse between those samples.

The second comparison value may be a slope determined by determining a quotient of a difference between a selected sample and a sample obtained immediately subsequent thereto divided by a time lapse between those samples.

Thus, controlling the sample rate as a function of the sampled output parameter may include the steps of: setting a maximum desired deviation for succesive samples of the output parameter; sampling a plurality of samples of sampled output parameter, substantially determined by a quotient of a reciprocal of a bandwidth of a controlled system of the controlled device and a minimum conversion time determined by the control device; obtaining the plurality of samples of sampled output parameter by a successive sampling at a selected sample rate; utilizing the plurality of samples of sampled output parameter to obtain a first primary correlation value; setting a minimum desired deviation as substantially a minimum of: the first primary correlation value and a desired maximum deviation; obtaining a plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate; and utilizing the plurality of samples of sampled output parameter to determine, substantially, a second primary correlation value and a secondary correlation value.

If the second primary correlation value of the plurality of samples of sampled output parameter is less than or equal to a minimum desired deviation, the control device disregards sampling a subsequent plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate, followed by recycling iteratively to set a minimum desired deviation as substantially a minimum of: the second primary correlation value and the desired maximum deviation, to obtain a succesive plurality of samples of sampled output parameter, substantially determined by a quotient of a reciprocal of a bandwidth of a controlled system of the controlled device and a minimum conversion time determined by the control device, to determine substantially a second primary correlation value and a secondary correlation value of the plurality of samples of sampled output parameter, and to compare.

If a secondary correlation value of the plurality of samples of sampled output parameter is greater than a minimum desired deviation, then the sample rate control means further causes the control device to activate a function to automatically alter the transfer function as a function of the sample rate, followed by recycling iteratively to set a minimum desired deviation as substantially a minimum of: the second primary correlation value and the desired maximum deviation, to obtain a successive plurality of samples of sampled output parameter, substantially determined by a quotient of a reciprocal of a bandwidth of a controlled system of the controlled device and a minimum conversion time determined by the control device, to determine substantially a second primary correlation value and a secondary correlation value of the plurality of samples of sampled output parameter, and to compare. In this case, at least one of the following is included: the first and second primary correlation values are arithmetic means of the immediately preceding plurality of samples of sampled output parameter; the secondary correlation value is a standard deviation of the immediately preceding plurality of samples of sampled output parameter; and the step of determining that the secondary correlation value is greater than the minimum desired deviation further includes altering the transfer function.

Figure 3:
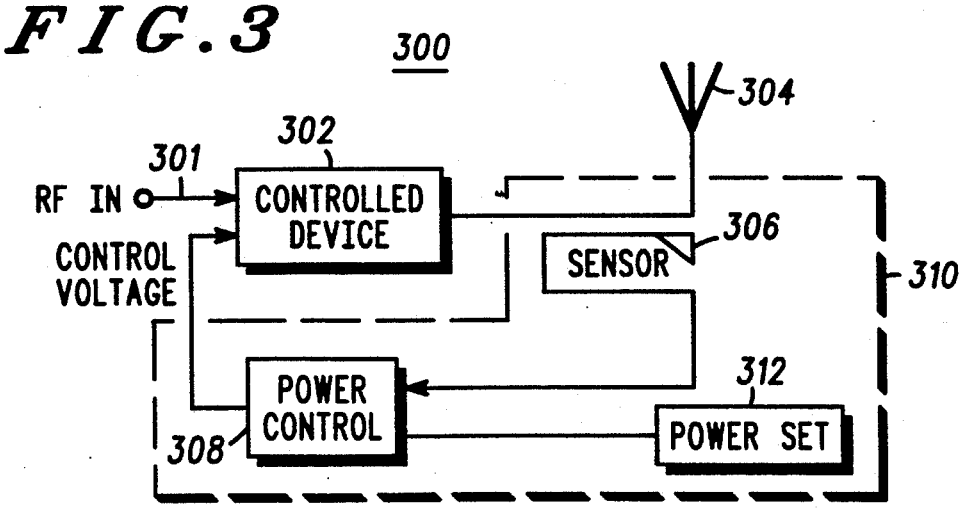
FIG. 3 is a block diagram of a microprocessor-based power control system for a power amplifier in accordance with this invention.

FIG. 3, generally depicted by the numeral 300, sets forth a block diagram of a microprocessor-based power control system of the present invention, depicting control system voltage input and radio frequency (RF) input (301) to a controlled device, typically a power amplifier (302). A sensor (306) provides feedback input to the power control device (308) that supplies a control system voltage to the controlled device (302). The control system voltage utilizes the sensor feedback input in accordance with the present invention to adjust amplification of a RF signal input supplied to the controlled device (302), such that an antenna (304) transmits a desired amplification of a RF signal. the power control (308), together with a power setting input control (312) and the sensor (306), make up a feedback device system (310) for implementing the present invention. The power control (308) may be set to a predetermined control voltage value by the power setting input control (312).

More particularly, a power control (308) together with a sensor (306) function as a control device (310) for controlling, at least in part, a controlled device (302), typically a power amplifier.

FIG. 4, generally depicted by the numeral 400, sets forth a block diagram of a closed loop feedback control system, including a forward signal flow path power set (401) for a power control system with a microprocessor (402), a D/A converter (404), a voltage level adjuster (406), a transducer (408), and a first transfer function (410), together with a feedback signal flow path with a sensor (416) and an A/D converter (414). The voltage level adjuster (406), together with the transducer (408) and the first transfer function (410), are aggregated to provide a second net transfer function (412) that is utilized with the sensor (416) to provide a power control input for the control device (402). A D/A converter and an A/D converter may be embodied within the power control unit or may be separate units as shown in FIG. 4. The controlled device has a first transform function (410), and is controlled, at least in part, by the control device. A D/A converter and an A/D converter may be embodied within a power control unit or may be separate units as shown in FIG. 4.

The control device adjustments on the controlled device provide a dynamic manipulation of control loop characteristics, controlling $V_{out}$ (418), eliminating the need for a dedicated control system microprocessor, and allowing for flexibility in control system modification. Simultaneously, the efficiency of the control device is optimized.

FIG. 5, numeral 500, is a diagram illustrating root loci for a second order control system setting forth two selected sampling times in accordance with the invention. As is known in the art, the horizontal axis and the y axis depict, respectively, the Re, real, and jIm, imaginary, portions of a root locus, the unit circle (503) being displayed for comparison purposes. Root contours for periods, T=1 (501) and T=0.1 (501) are depicted on the root locus (504). It is clear that changing of the sampling period allows a predictable change in root locus for a second order control system, and suggests a similar response predictability in higher order control systems.

FIG. 6 is a graph setting forth a sampling time switching for a unit step power response of a second order system with respect to time in accordance with the present invention. As is known in the art, the x axis and y axis, respectively, represent time in seconds, and output, typically voltage. Clearly, the selected time periods, T=1 (601), T=2 (602), T=3 (603), T=4 (604), T=5 (605), and T=6 (606), allow for selection such that an output will be increased or decreased in accordance with the invention.

We claim:

1. A control device for controlling a controlled device having a transfer function, wherein the control device controls the controlled device by sampling an output parameter of the controlled device at a sample rate to obtain at least three samples: a selected sample, a sample previous thereto, and a further selected sample: the control device comprising:

A) sample rate control means, responsive to a sampled output parameter, for controlling the sample rate as a function thereof; and
B) transfer function control means, responsive to the sample rate control means, for automatically altering the transfer function as a function of the sample rate, wherein;
the sample previous thereto is that sample obtained immediately previous thereto and the further selected sample is that sample obtained immediately subsequent thereto,
a desired maximum deviation for a difference between the selected sample and the sample previous thereto is an input to the control device,
the sample previous thereto is that sample obtained immediately previous thereto,
the sample rate control means controls the sample rate as a function of a plurality of samples of sampled output parameter, and
the plurality of samples of sampled output parameter is substantially determined by a quotient of a reciprocal of a bandwidth of a controlled system of the controlled device and a minimum conversion time determined by the control device.

2. The control device of claim 1, wherein the sample rate control means sets a minimum desired deviation as substantially a minimum of: the first comparison reference value and the desired maximum deviation.

3. The control device of claim 1, wherein the sample rate control means further compares a first difference between the selected sample of the output parameter and the sample previous thereto with a second difference between the further selected sample and the selected sample.

4. The control device of claim 1, wherein, when the sample rate control means has set a minimum desired deviation as substantially a minimum of: the first comparison reference value and the desired maximum deviation, the sample rate control means further obtains a plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate.

5. The control device of claim 4, wherein the plurality of samples of sampled output parameter is utilized to determine, substantially, first and second comparison reference values.

6. The control device of claim 5, wherein the first comparison reference value is an arithmetic mean of the plurality of samples of sampled output parameter.

7. The control device of claim 5, wherein the second comparison reference value is a standard deviation of the plurality of samples of sampled output parameter.

8. The control device of claim 7, wherein,
if the standard deviation of the plurality of samples of sampled output parameter is less than or equal to the minimum desired deviation, then the sample rate control means further causes the control device to disregard sampling a plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate.

9. The control device of claim 8, wherein,
if the control device disregards sampling the plurality of samples of sampled output parameter, substantially determined by a quotient of a reciprocal of a bandwidth of a controlled system of the controlled device and a minimum conversion time determined by the control device, the plurality of samples output parameter being obtained by a successive sampling at a selected sample rate,
then the sample rate control means further recycles iteratively to set a minimum desired deviation as substantially a minimum of: the first comparison reference value and the desired maximum deviation, the sample rate control means further obtains a plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate.

10. The control device of claim 7, wherein,
if the standard deviation of the plurality of samples of sampled output parameter is greater than the minimum desired deviation,
then the sample rate control means further causes the control device to activate a function to automatically alter the transfer function as a function of the sample rate.

11. The control device of claim 10, wherein,
if the standard deviation of the plurality of samples of sampled output parameter is greater than the minimum desired deviation and the sample rate control means has caused the control device to activate a function to automatically alter the transfer function as a function of the sample rate,
then the sample rate control means further recycles iteratively to set a minimum desired deviation as substantially a minimum of: the first comparison reference value and the desired maximum deviation, the sample rate control means further obtains a plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate.

12. A control device for controlling a controlled device having a transfer function, wherein the control device controls the controlled device by sampling an output parameter of the controlled device at a sample rate to obtain at least three samples; a selected sample, a sample previous thereto, and a further selected sample; the control device comprising:

A) sample rate control means, responsive to a sampled output parameter, for controlling the sample rate as a function thereof; and
B) transfer function control means, responsive to the sample rate control means, for automatically altering the transfer function as a function of the sample rate, wherein the sample rate control means controls the sample rate as a function of a plurality of samples of sampled output parameter,
wherein the plurality of samples of sampled output parameter is obtained by a successive sampling at a selected sample rate.

13. A control device for controlling a controlled device having a transfer function, wherein the control device controls the controlled device by sampling an output parameter of the controlled device at a sample rate to obtain at least three samples: a selected sample, a sample previous thereto, and a further selected sample; the control device comprising:

A) sample rate control means, responsive to a sampled output parameter, for controlling the sample rate as a function thereof; and
B) transfer function control means, responsive to the sample rate control means, for automatically altering the transfer function as a function of the sample rate, wherein the sample rate control means controls the sample rate as a function of a plurality of samples of sampled output parameter, wherein the plurality of samples of sampled output parameter is utilized to obtain a first comparison reference value,
wherein the first comparison reference value is an arithmetic mean of the plurality of samples of sampled output parameter, and the sample rate control means sets a minimum desired deviation as substantially a minimum of: the first comparison reference value and the desired maximum deviation, and
when the sample rate control means has set a minimum desired deviation as substantially a minimum of; the first comparison reference value and the desired maximum deviation, the sample rate control means further obtains a plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate,
the plurality of samples of sampled output parameter is utilized to determine, substantially, first and second comparison reference values,
the first comparison reference value is an arithmetic mean of the plurality of samples of sampled output parameter,
the second comparison reference value is a standard deviation of the plurality of samples of sampled output parameter, such that;
AA) if the standard deviation of the plurality of samples of sampled output parameter is less than or equal to the minimum desired deviation, then the sample rate control means further causes the control device to disregard sampling a plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate;

BB) if the control device disregards sampling the plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate, then the sample rate control means further recycles iteratively to set a minimum desired deviation as substantially a minimum of; the first comparison reference value and the desired maximum deviation, the sample rate control means further obtains a plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate;

CC) if the standard deviation of the plurality of samples of sampled output parameter is greater than the minimum desired deviation, then the sample rate control means further causes the control device to activate a function to automatically alter the transfer function as a function of the sample rate; and DD) if the standard deviation of the plurality of samples of sampled output parameter is greater than the minimum desired deviation and the sample rate control means has caused the control device to activate a function to automatically alter the transfer function as a function of the sample rate, then the sample rate control means further recycles iteratively to set a minimum desired deviation as substantially a minimum of; the first comparison reference value and the desired maximum deviation, the sample rate control means further obtains a plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate.

14. The control device of claim 13, wherein the first comparison reference value is an arithmetic mean of the plurality of samples of sampled output parameter.

15. A control device for controlling a controlled device having a transfer function, wherein the control device controls the controlled device by sampling an output parameter of the controlled device at a sample rate to obtain at least three samples: a selected sample, a sample previous thereto, and a further selected sample; the control device comprising:

A) sample rate control means, responsive to a sampled output parameter, for controlling the sample rate as a function thereof; and B) transfer function control means, responsive to the sample rate control means, for automatically altering the transfer function as a function of the sample rate, wherein the sample rate control means further compares a first difference between the selected sample of the output parameter and the sample previous thereto with the second difference between the further selected sample and the selected sample, wherein, AA) if the first difference between the selected sample of the output parameter and the sample previous thereto is compared with the second difference between the further selected sample and the selected sample, and the second difference between the further selected sample and the selected sample is greater than the first difference between the selected sample of the output parameter and the sample previous thereto, and the first difference between the selected sample of the output parameter and the sample previous thereto is substantially equal to 0, then the sample rate control means selects a maximum sample rate allocated for control usage by the control device, BB) if the first difference between the selected sample of the output parameter and the sample previous thereto is compared with the second difference between the further selected sample and the selected sample, and the second difference between the further selected sample and the selected sample is greater than the first difference between the selected sample of the output parameter and the sample previous thereto, and the first difference between the selected sample of the output parameter and the sample previous thereto is not substantially equal to 0, then the sample rate control means selects a minimum sample rate value from: a product of the sample rate multiplied by two; and a maximum sample rate allocated for control usage by the control device; and CC) if the first difference between the selected sample of the output parameter and the sample previous thereto is compared with the second difference between the further selected sample and the selected sample, and the second difference between the further selected sample and the selected sample is less than the first difference between the selected sample of the output parameter and the sample previous thereto, then the sample rate control means selects a maximum sample rate value from; a quotient of the sample rate divided by two; and a minimum sample rate allocated for control usage by the control device.

16. The control device of claim 15, wherein,
if the sample rate control means determines that the sample rate must be changed in response to a preceived difference in values of the first difference between the selected sample of the output parameter and the sample previous thereto compared with the second difference between the further selected sample and the selected sample,
then the sample rate control means alters the sampling period thereby altering the transfer function.

17. The control device of claim 16, wherein altering the transfer function is accomplished by automatic selection of a sampling rate that alters a characteristic output response in accordance with a preselected desired output response.

18. The control device of claim 17, wherein, when the transfer function has been altered, the transfer function control means further functions iteratively to recycle to compare a first difference between the selected sample of the output parameter and the sample previous thereto compared with a second difference between the further selected sample and the selected sample.

19. A method for controlling a controlled device having a transfer function, wherein the control device controls the controlled device by sampling an output parameter of the controlled device at a sample rate to obtain at least three samples: a selected sample, a samples previous thereto, and a further selected sample; the method comprising the steps of:
   A) controlling the sampling rate as a function of the sampled output parameter; and
   B) automatically altering the transfer function as a function of the sampling rate,
wherein the step of controlling the sample rate as a function, at least in part, of the sampled output parameter further includes the steps of:
   AA) obtaining at least three samples of the output parameter;
   BB) determining at least a first and a second comparison reference value utilizing the sampled output parameter values;
   CC) determining, if the second comparison reference value is greater than the first comparison reference value and the first reference value is substantially equal to zero, then the sample rate is a maximum sample rate allocated for control usage by the control device;
   DD) determining, if the second comparison reference value is greater than the first comparison reference value and the first comparison reference value is substantially not zero, then the sample rate is substantially a minimum of: a product of the sample rate multiplied by two and a maximum sample rate allocated for control usage by the control device; and
   EE) determining, if the second comparison reference value is less than the first comparison reference value, then the sample rate is a maximum of: a quotient of the sample rate divided by two and a minimum sampling rate allocated for control usage by the control device, thus automatically altering a damping coefficient related to the system and providing an output response in accordance with an approximated preselected desired output response.

20. The method of claim 19, wherein the sample previous thereto is that sample obtained immediately previous thereto and the further selected sample is that sample obtained immediately subsequent thereto.

21. The method of claim 19, wherein the at least three samples are a selected sample, a sample obtained immediately previous thereto, and a sample obtained immediately subsequent thereto.

22. The method of claim 19, wherein the first comparison value is determined by determining a quotient of a difference between a selected sample and a sample obtained immediately previous thereto divided by a time lapse between those samples.

23. The method of claim 19, wherein the second comparison value is determined by determining a quotient of a difference between a selected sample and a sample obtained immediately subsequent thereto divided by a time lapse between those samples.

24. The method of claim 19, wherein the step of controlling the sample rate as a function of the sampled output parameter further includes the steps of:
   AAA) setting a maximum desired deviation for successive samples of the output parameter;
   BBB) sampling a plurality of samples of sampled output parameter, substantially determined by a quotient of a reciprocal of a bandwidth of a controlled system of the controlled device and a minimum conversion time determined by the control device;
   CCC) obtaining the plurality of samples of sampled output parameter by a successive sampling at a selected sample rate;
   DDD) utilizing the plurality of samples of sampled output parameter to obtain a first primary correlation value;
   EEE) setting a minimum desired deviation as substantially a minimum of: the first primary correlation value and a desired maximum deviation;
   FFF) obtaining a plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate; and
   GGG) utilizing the plurality of samples of sampled output parameter to determine, substantially, a second primary correlation value and a secondary correlation value;
      1) if the second primary correlation value of the plurality of samples of sampled output parameter is less than or equal to a minimum desired deviation, then causing the control device to disregard sampling a subsequent plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate,
      followed by recycling iteratively to set a minimum desired deviation as substantially a minimum of: the second primary correlation value and the desired maximum deviation, to obtain a successive plurality of samples of sampled output parameter, substantially determined by a quotient of a reciprocal of a bandwidth of a controlled system of the controlled device and a minimum conversion time determined by the control device, to determine substantially a second primary correlation value and a secondary correlation value of the plurality of samples of sampled output parameter, and to compare as described GGG (1);
      2) if a secondary correlation value of the plurality of samples of sampled output parameter is greater than a minimum desired deviation, then the sample rate control means further causes the control device to activate a function to automatically alter the transfer function as a function of the sample rate,
      followed by recycling iteratively to set a minimum desired deviation as substantially a minimum of: the second primary correlation value and the desired maximum deviation, to obtain a successive plurality of samples of sampled output parameter, substantially determined by a quotient of a reciprocal of a bandwidth of a controlled system of the controlled device and a minimum conversion time determined by the control device, to determine substantially a second primary correlation value and a secondary correlation value of the plurality of samples of sampled output parameter, and to compare as described GGG (2) wherein at least one of:
   (a) the first and second primary correlation values are arithmetic means of the immediately preceding plurality of samples of sampled output parameter;
   (b) the secondary correlation value is a standard deviation of the immediately preceding plurality of samples of sampled output parameter, and
   (c) the step of determining that the secondary correlation value is greater than the minimum desired deviation further includes altering the transfer function, such that the step of altering the transfer function is accomplished by automatic selection of a sampling rate that alters a characteristic output response in accordance with a preselected desired output response and further includes iteratively recycling to the step of obtaining a plurality of samples of sampled output parameter, substantially determined by a quotient of a reciprocal of a bandwidth of a controlled system of the controlled device and a minimum conversion time determined by the control device, the plurality of samples of sampled output parameter being obtained by a successive sampling at a selected sample rate comparing a selected sampling of the output parameter with a comparison reference value determined for a plurality of previous samples of the output parameter, and iteratively proceeding therefrom.

25. A control device having a power control system with an input value, for utilizing variation of a sampling rate of an output value of the power control system to adjust a transfer function of the power control system, comprising:
   A) a sensor responsive to the sampling rate for storing that sampling rate of the power control system output values;
   B) a power control device responsive to the sensor for implementing the sampling rate, and accumulating and storing at least three power control system output values, for utilizing the at least three power control system output values to determine at least two comparison values, being a prior power control system output difference value (that is, a difference between a first two of the three power control system output values) and a latter power control system output difference value (that is, a difference between a last two of the three power control system output values); and for regulating the sampling rate in conformance with the at least two comparison values, such that the transfer function of the power control system is automatically adjusted,
wherein one of;
   (a) if a latter power control system output difference value is smaller than a prior power control system output difference value, then the regulation means modifies the sample rate to the larger of; a quotient of the sampling rate divided by 2 or the minimum sampling rate allowed by the power control system,
   (b) if a latter power control system output difference value is substantially equal to a prior power control system output value, then the regulation means effectively maintains a same sample rate,
   (c) if a latter power control system output difference value is larger than a prior power control system output difference value and the prior power control system output difference value is substantially not equal to zero, then the regulation means effectively sets the sampling rate equal to the larger of: a product of the sampling rate multiplied by 2 or the maximum sampling rate allowed for power control usage by the power control system, and
   (d) if a latter power control system output difference value is larger than a prior power control system output difference value and the prior power control system output difference value is substantially equal to zero, then the regulation means effectively sets a sample rate equal to the maximum sampling rate allowed for power control usage by the power control system, thus automatically altering a damping coefficient related to the system and providing an output response in accordance with an approximated preselected desired output response.

26. The device of claim 25, wherein the control device is a processor.

27. The device of claim 25, wherein the power control system input value is a detectable voltage input.

28. The device of claim 25, wherein the power control system input value is a detectable power input.

29. The device of claim 25, wherein the sampling rate is a maximum sampling frequency allocated to the device for power control usage.

30. The device of claim 25, wherein the at least three power control output values are detectable voltage outputs.

31. The device of claim 25, wherein the at least three power control output values are detectable power outputs.

32. The device of claim 25, wherein the power control system transfer function is that of an analog system.

33. The device of claim 25, wherein the power control device obtains at least two difference values between the at least three successive power control system output values.

34. The device of claim 25, further including means for iteratively utilizing the first storage means, implementation, accumulation, and second storage means, comparison and third storage means, and regulation means therein to adjust the transfer function of the power control system.

35. The device of claim 25, wherein adjusting the transfer function is accomplished by automatic selection of a sampling rate that alters a characteristic output response in accordance with a preselected desired output response.

36. The control device of claim 25, wherein, when the transfer function has been adjusted, the transfer function control means further functions iteratively to recycle to compare a latter power control system output difference value with a prior power control system output difference value, and function as described herein.

37. A method for utilizing selective variation of a sampling rate of output values of a power control system to adjust a transfer function of the power control system, comprising the steps of;
   A) selecting a sampling rate of the power control system output values;

B) implementing the sampling rate, and obtaining at least three power control system output values;

C) utilizing the at least three power control system output values to determine at least two comparison values, being a previous power control system output difference value (that is, a difference between a first two of the three power control system output values) and a subsequent power control system output difference value (that is, a difference between a last two of the three power control system output values);

D) regulating the sample rate in conformance with the at least two comparison values; and E) regulating the transfer function in conformance with the at least two comparison values relative to the sample rate including at least one of:

(a) if a subsequent power control system output difference value is smaller than a previous power control system output difference value, further including modifying the sampling rate to the larger of: a quotient of the sampling rate divided by 2 and the minimum sampling rate allowed by the power control system, (b) if a subsequent power control system output difference value is substantially larger than a previous power control system output difference value, and a previous power control system output difference value is substantially equal to zero, further including modifying the sampling rate to the smaller of: of a product of the sampling rate multiplied by 2 and the maximum sampling rate allowed by the power control system, (c) if a subsequent power control system output difference value is substantially larger than a previous power control system output difference value, and a previous power control system output difference value is not substantially equal to zero, further including modifying the sampling rate to the maximum sampling rate allowed by the power control system, and (d) if the method determines that a latter power control system output difference value is substantially equal to a prior power control system output difference value, further including regulating the sampling rate in conformance with the at least two comparison values by maintaining th sample rate unchanged, thus automatically altering a damping coefficient related to the system and providing an output response in accordance with an approximated preselected desired output response.

38. The method of claim 37, wherein the step of selecting a sampling rate of the power control system output values further includes utilizing a sampling rate equal to a maximum sample frequency allocated to a device for power control usage.

39. The method of claim 37, wherein the step of obtaining at least three power control system output values further includes obtaining at least three power control output values that are detectable voltage outputs.

40. The method of claim 37, wherein the step of obtaining at least three power control system output values further includes obtaining at least three power control output values that are detectable power outputs.

41. The method of claim 37, wherein the step of adjusting the transfer function further includes utilizing a power control system transfer function of an analog data system.

42. The method of claim 37, wherein the step of utilizing the at least three power control system output values to detemine at least two comparison values further includes obtaining at least two difference values between the at least three power control system output values.

43. The method of claim 37, wherein the step of regulating the transfer function in conformance with the at least two comparison values relative to the sample rate further includes automatic selection of a sampling rate that alters a characteristic output response in accordance with a preselected desired output response.

44. The method of claim 37, wherein the step of regulating the transfer function in conformance with the at least two comparison values relative to the sample rate further includes iteratively recycling to compare a latter power control system output difference value with a prior power control system output difference value, and iteratively functioning stepwise as described in steps (A)-(E) of claim 37.

* * * * *

UNITED STATES PATENT AND TRADEMARK OFFICE
CERTIFICATE OF CORRECTION

PATENT NO. : 5,177,695
DATED : January 5, 1993
INVENTOR(S) : Sheehyung Sung; Edem Nkanta It is certified that error appears in the above-identified patent and that said Letters Patent is hereby corrected as shown below:

In the claims:

At column 16, line 26, "detemine" should be --determine--.

Signed and Sealed this

Sixteenth Day of November, 1993

Attest:

BRUCE LEHMAN

*Attesting Officer*  *Commissioner of Patents and Trademarks*